March 3, 1931.  R. MACLEAN  1,794,719
MACHINE FOR MANUFACTURING PREPARED ROOFING
Filed March 1, 1926  4 Sheets-Sheet 1
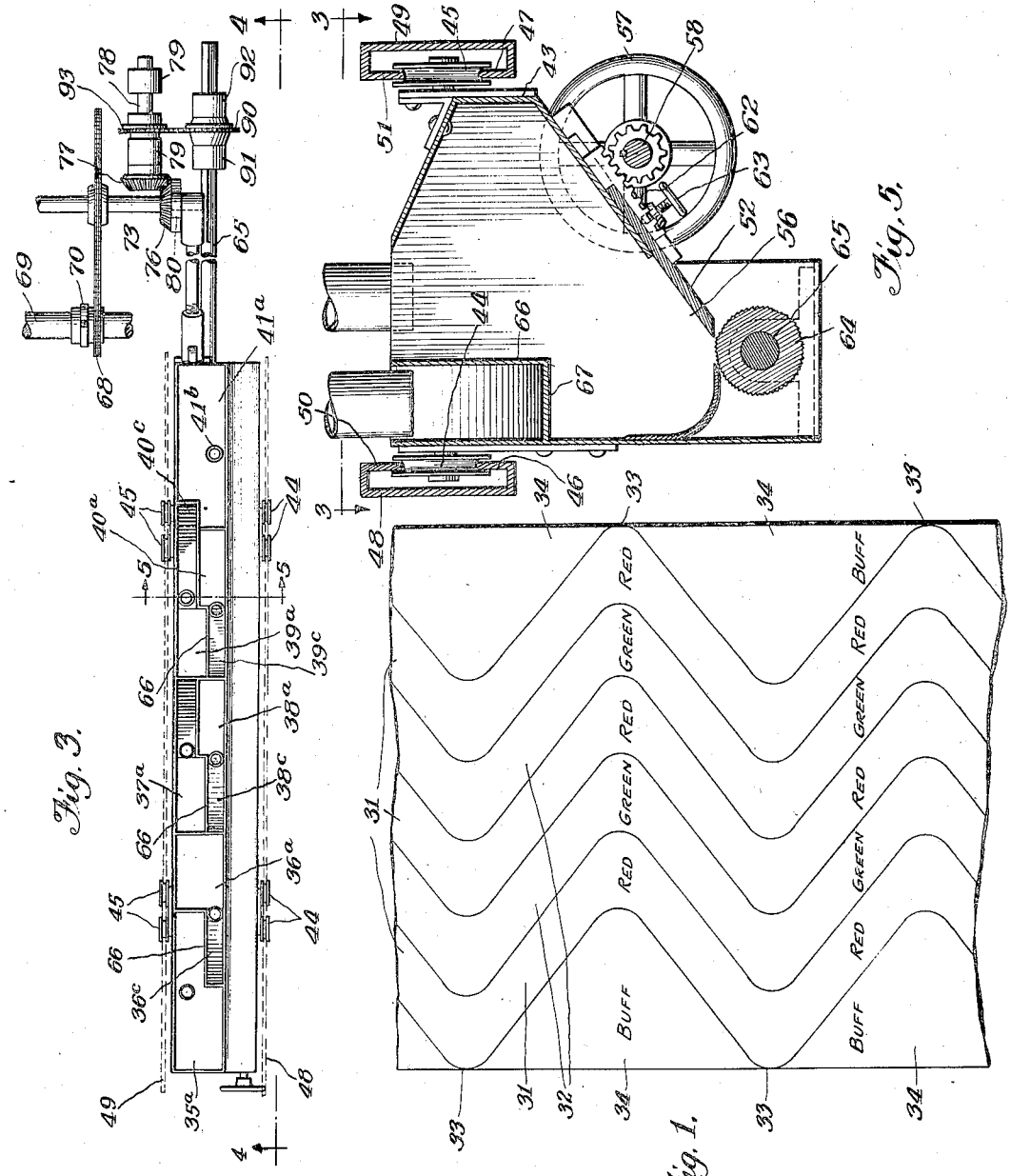
Inventor
Robert Maclean.
By Pierce & Sweet
Attys.

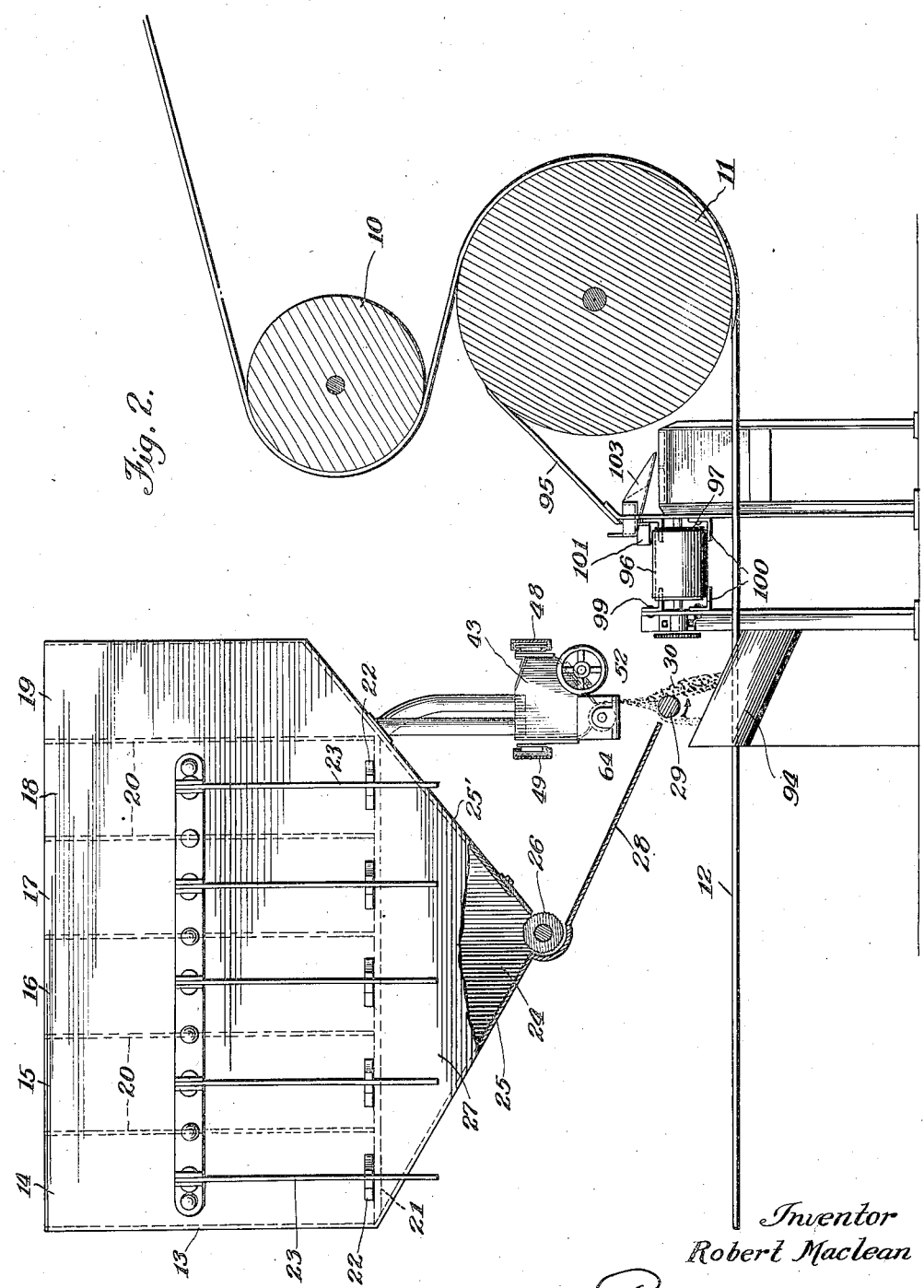

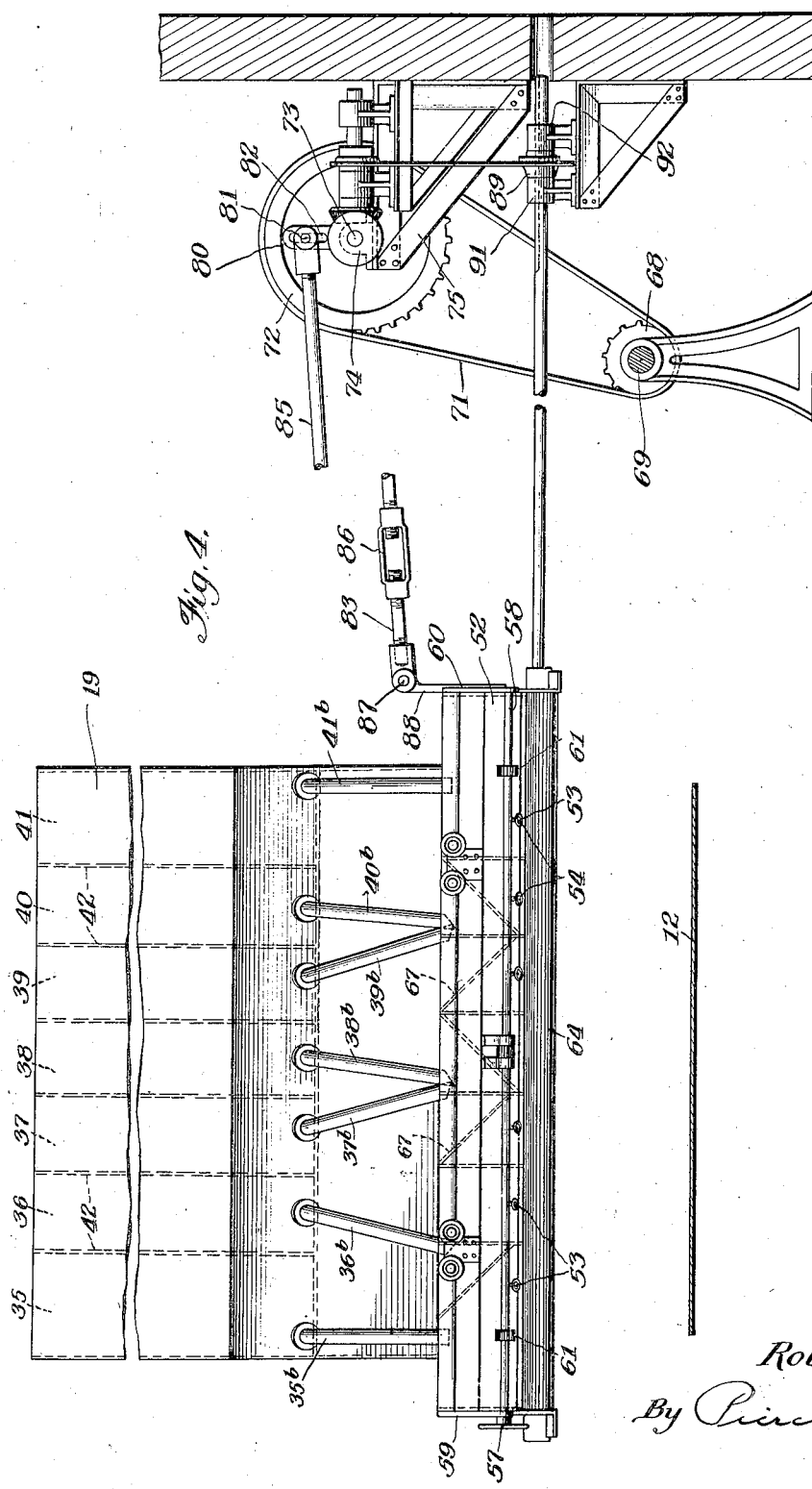

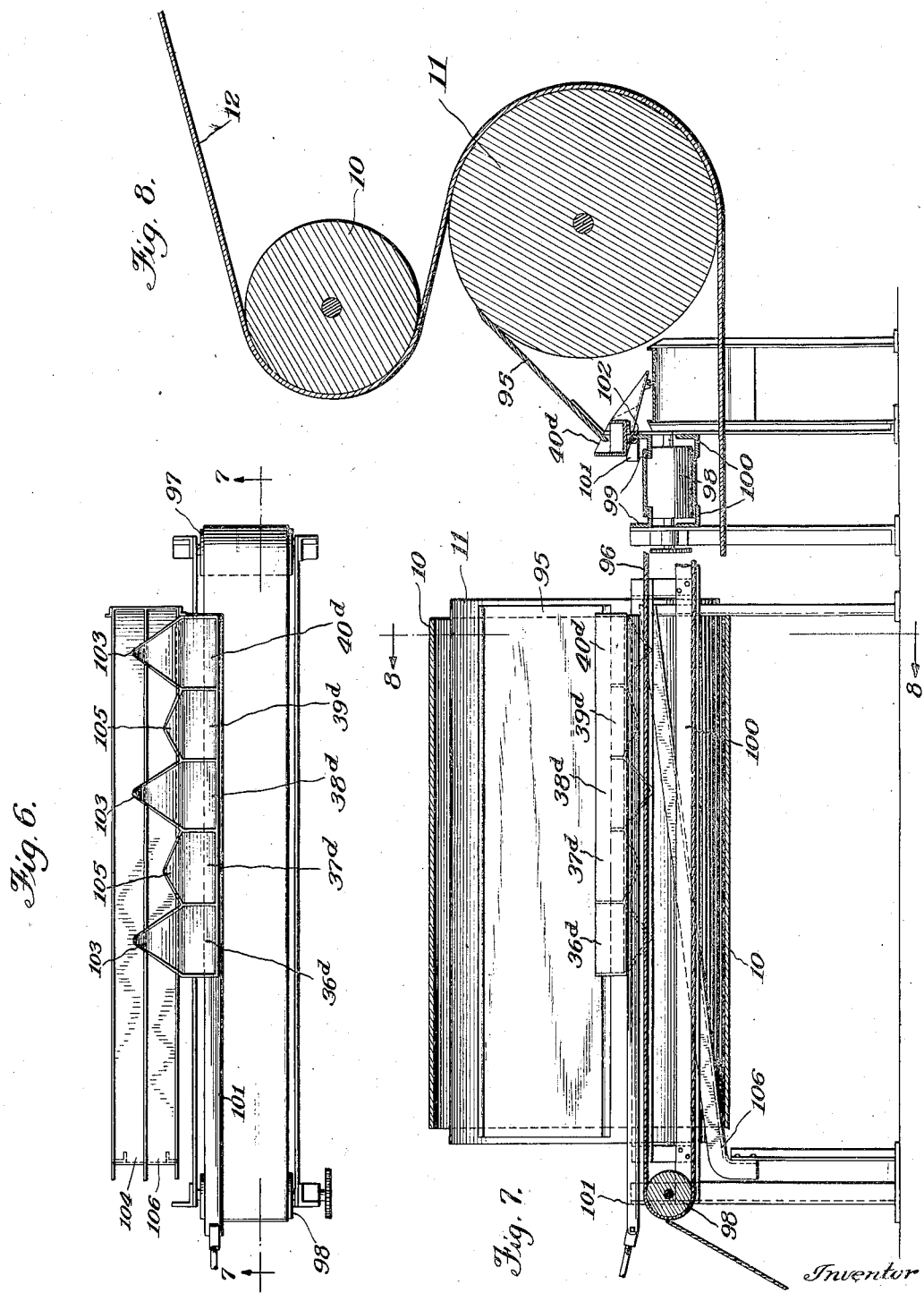

Patented Mar. 3, 1931

1,794,719

UNITED STATES PATENT OFFICE

ROBERT MACLEAN, OF CHICAGO, ILLINOIS, ASSIGNOR TO AMALGAMATED ROOFING COMPANY, OF CHICAGO, ILLINOIS, A CORPORATION OF ILLINOIS

MACHINE FOR MANUFACTURING PREPARED ROOFING

Application filed March 1, 1926. Serial No. 91,472.

My invention relates to improvements in machines for manufacturing prepared roofing, and is particularly concerned with the provision of a machine of novel construction for applying grits, or other surfacing materials, to strips of prepared roofing.

At the present time there is a very considerable demand for prepared roofing made from paper felt saturated with suitable moisture repellents and coated, or surfaced, with various kinds of pulverized or granulated surfacing materials. In some cases the strips of roofing that have been suitably saturated with a moisture repellent are uniformly covered with surfacing material of uniform color or character, while in other cases the demand is for a roofing comprising different colored surfacing materials. Heretofore, it has required one machine for making roofing in which the entire surface of the strip is covered with one color or character of surfacing material and another machine for applying the surfacing materials of different colors or character.

One of the objects of my present invention is to provide a single machine that can be used either for making a roofing material having a weather surface of uniform color or character, or, for making roofing material having a weather surface that includes a plurality of different colored surfacing materials.

Another object of my invention is to provide a machine, such as described, that comprises means for easily and quickly changing from a setting in which the surfacing material applied to the saturated roofing material is of one color or characteristic to a setting in which the surfacing material is of another color or characteristic, or to still another setting in which a plurality of different colored, or different kinds, of surfacing material may be applied to the saturated felt strip.

In addition, my invention contemplates the provision of a machine in which the surfacing materials of different colors or characteristics may be deposited upon the felt strip in suitable patterns, and by which, if desired, any suitable color of surfacing material may be more or less lightly spread over the entire strip to produce a blending of the various different colors employed.

A further object of my invention is to provide means, to be used in conjunction with the means for applying surfacing materials of different colors or characteristics, for separately recovering the excess surfacing materials of different colors or characteristics that are thrown from the felt strip. In this connection it will, of course, be understood that in order to insure a complete and satisfactory covering of the strip by the surfacing materials it is necessary to discharge upon this strip a quantity of such materials in excess of that required to completely cover it. These excess materials are thrown off the strip and my invention, as stated above, contemplates recovering these excess materials but separated as to color or character, so that they may be returned to that part of the feeding mechanism from which they were discharged.

A further object of my invention is to provide means of the character described that is simple in construction, economical to manufacture and not likely to get out of order.

Other objects of my invention will appear as this description progresses, reference being had to the accompanying drawings, in which Figure 1 is a plan view of a portion of a strip of roofing material produced with one setting of my improved machine;

Figure 2 is a side elevation, partially in section, of a portion of a surfacing machine embodying my invention;

Figure 3 is a plan view of the auxiliary hopper and its operating mechanism, used for distributing grits, or other surfacing material, of different colors or characteristics, upon the saturated felt strip, portions of the mechanism being broken away for the purpose of better illustration. Considered as a section, this view is taken on line 3—3 of Figure 5.

Figure 4 is a vertical section taken on line 4—4 of Figure 3;

Figure 5 is a transverse section taken on line 5—5 of Figure 3;

Figure 6 is a plan view of one embodiment of the means that I employ for separately recovering the excess surfacing materials of different colors or characteristics;

Figure 7 is a vertical section taken on line 7—7 of Figure 6, portions thereof being broken away; and Figure 8 is a vertical section taken on line 8—8 of Figure 7.

Throughout the several figures similar reference characters are used for referring to similar parts and the several sections are taken looking in the direction of the small arrows.

The conventional machine for making prepared roofing ordinarily comprises a suitable looping mechanism, a saturating tank, or tanks, for receiving the paper from the looping mechanism, and saturating it with one or more kinds of moisture repellents, then means for applying the surfacing materials, cooling rolls, drying mechanism, etc. In the drawings of this application I have omitted all disclosures of the above mentioned portions of the mechanism, except those that have directly to do with the application of the surfacing materials.

In Figure 2 I have shown the upper and lower cooling rolls 10 and 11, respectively, that may be of conventional construction and which are used for drawing the felt strip 12 through the saturating tank, or tanks, and underneath the mechanism employed for applying the surfacing materials. Suitably supported above the level of the felt strip 12 is a main hopper 13 that comprises a plurality of bins 14, 15, 16, 17, 18 and 19. These bins are formed by the vertically extending partitions 20 and the bottoms of these bins are formed by the bottom wall 21 shown in Figure 2. This wall is provided with a discharge opening for each of the bins, except the bin indicated by the reference character 19, and suitable slide valves 22, operated by levers 23. By the means just described, any one or more of the bins 14, 15, 16, 17 or 18 can be placed in communication with the equalizing chamber 24, formed by the two inclined plates 25 and 25' and suitable end walls, only the front one 27 of which is shown. A corrugated feed roll 26, driven from any suitable source of power and usually connected with a moving part of the mechanism, provides means for transferring the surfacing materials from the equalizing chamber 24 onto the feed plate 28, from which the surfacing materials are discharged onto a distributing roller 29, likewise driven from any moving part of the mechanism in the direction of the arrow 30. This distributing roll permits the heavier particles of the surfacing materials, particularly if the latter are "grits", to pass over it before dropping onto the saturated felt, but causes most of the lighter particles to be deposited upon the felt before the latter receives the heavier particles.

The construction thus far described is similar to that disclosed in my Patent No. 1,574,835, issued March 2, 1926, to which reference may be made for further explanation. It is sufficient to state here that by manipulating the proper lever, or levers, 23 the contents of any one or more of the bins 14, 15, 16, 17 or 18 can be gradually fed to the moving felt strip 12. It will, of course, be understood that any suitable means may be employed for supplying the grits to the bins.

The construction just described provides means for supplying to the entire width of the felt strip surfacing material, or materials, of uniform characteristic or color. This surfacing material may be formed by combining grits or other suitable materials of different colors, but whatever color or combination of colors is employed, the appearance of the coated strip will be uniform throughout.

As stated above, it is sometimes desired to apply the different colored grits or surfacing materials, or materials of different characteristics, to the strip in stripes or patterns so as to lessen the somewhat monotonous appearance created by a uniform coating or surfacing, and in the present embodiment of my invention I have shown means for applying the surfacing materials to the felt strip so as to form a pattern approximately like that shown in Figure 1. In order to simplify the explanation, I shall hereafter refer to the surfacing materials employed as grits, which may be granulated slate, porcelain, glass, baked earthy materials, or any other similar materials used for this purpose, but it is to be clearly understood that where the terms grit or grits are employed they are intended to include any kind of surfacing materials, and that while I shall refer to grits of different colors, this is intended to include surfacing materials of different characteristics.

In Figure 1 I have shown a pattern effect produced by the use of grits of three different colors, namely, buff, red and green. It will be noted that the red and green are applied in alternate stripes 31 and 32, respectively. While the mechanism that I am about to describe is capable of producing straight stripes of grits extending parallel with the length of the felt, it also comprises means for giving these stripes a more or less wavy, or zig-zag, shape, as shown in Figure 1. Preferably, though not necessarily, the extent to which the stripes are off-set toward the edges of the felt is such that the peaks 33 closely approach the edges of the felt. The triangular spaces 34, formed by the sides of the stripes that produce the peaks, are preferably, though not necessarily, covered by grits of the same color.

In this particular example these grits would be buff colored as indicated.

For the purpose of producing the pattern effect of Figure 1 I divide the bin 19 into a plurality of compartments 35, 36, 37, 38, 39, 40 and 41, by means of the vertically extending partitions 42, and suitable means are provided for supplying each of these compartments with grits of the desired color. For instance, to produce the pattern just described, compartments 35 and 41 would hold buff colored grits; compartments 36, 38 and 40 would contain red colored grits; and compartments 37 and 39 would contain the green colored grits.

An auxiliary hopper 43 is positioned beneath the bin 19 and extends transversely of the machine being described. This hopper is provided with pairs of rollers 44 and 45, respectively, upon its opposite sides that roll upon the flanges 46 and 47 of the tracks 48 and 49, respectively. These tracks are made in the form of a channel, having the downturned flanges 50 and 51, respectively, for preventing the rollers from leaving the flanges 46 and 47 (see Figure 5).

The bottom of the hopper 43 is provided with a gate 52 that extends the entire length of the hopper and is slidably retained thereon by means of bolts 53 that slide in slots 54 formed in the gate. This gate controls the discharge opening 56 of the hopper and it can be adjusted by means of the hand wheel 57 mounted on one end of the shaft 58. The ends of this shaft are mounted in suitable brackets 59 and 60 at the ends of the hopper and the shaft carries one or more pinions 61 for engaging the racks 62 that are secured to the gate. Screws 63 may be used for holding the gate in adjusted position.

The discharge past the gate is regulated or controlled by the feed roll 64 mounted upon the shaft 65. This regulating roll is preferably longitudinally fluted or corrugated, as shown in Figures 4 and 5.

The auxiliary hopper 43 is divided into a plurality of compartments 35a, 36a, 37a, 38a, 39a, 40a and 41a, corresponding in number to the number of compartments in the bin 19 of the main hopper. The number and width of these compartments may be varied at will in order to vary the pattern of the finished product, but it will be noticed that the two end compartments 35a and 41a are considerably longer than the intermediate compartments. The purpose of this construction is to compensate for the movement of the hopper transversely of the felt in the manner about to be described, which would, if the hopper were merely as long as the strip is wide, leave uncovered areas corresponding to the triangularly shaped areas 34 of Figure 1. In order to prevent such uncovered areas, the auxiliary hopper must be longer than the width of the felt by an amount substantially equal to the travel, or throw, of the auxiliary hopper.

While grits may be supplied to the compartments of the auxiliary hopper by manual operations, I prefer to do this automatically by providing each of the compartments 35 to 41, inclusive, of the main hopper with a discharge tube, or conduit, 35b, 36b, 37b, 38b, 39b, 40b and 41b, extending down to and slightly into the corresponding one of the compartments 35a to 41a, inclusive, of the auxiliary hopper. I have found that with this construction the level of the grits in the compartments of the auxiliary hopper will be maintained substantially constant because they will fill up to substantially the level of the discharge ends of the tubes 35b to 41b, inclusive, and maintain substantially this level.

In the embodiment of my invention shown herein, the travel, or throw, of the auxiliary hopper is substantially equal to the length of the two end compartments 35a and 41a, whereas, the length of the intermediate compartments is substantially half of the length of the outer compartments. In order, therefore, to permit different degrees of movement of the auxiliary hopper relatively to the ends of the discharge pipes 36b to 40b, inclusive, I have provided each of these compartments with a lateral extension as shown at 36c, 37c, 38c, 39c and 40c, each formed by a suitable partition 66 and an inclined bottom 67 (see Figure 5). In this manner, I am enabled to make the effective length of the intermediate compartments in the auxiliary hopper substantially equal to the length of the end compartments and, therefore, equal to the throw of the auxiliary hopper, so that the hopper can move throughout its full travel without causing any parts to contact with the bottom of any of the pipes, or conduits, 36b to 40b. Preferably, the bottoms of these pipes, or conduits, are beveled to correspond with the bevel of the bottoms 67 of their respective compartments, as shown in Figure 4.

It will be observed, from an inspection of Figure 4, that some of the bottoms of the extensions of the compartments slope in opposite directions, but this is merely to facilitate the placing of these extensions and it is to be further understood that my invention is not limited to any particular arrangement of these auxiliary extensions of the compartments, nor to extensions having inclined bottoms. These bottoms are made inclined simply to insure the transfer of the grits from each extension to its corresponding compartment.

It will be apparent from the above description that when the gate 52 is properly adjusted and the roll 64 is rotated, grits will be withdrawn from the compartments of the auxiliary hopper and drop onto the roller 29 and from thence onto the felt. If the auxiliary hopper remains stationary, the felt will be covered with a plurality of substantially parallel stripes, the edges of which slightly overlap or blend with each other due to the fact that the impingement of the grits upon the roller 29 causes a slight lateral spreading of the grits. When, however, a pattern effect similar to that shown in Figure 1 is desired, means must be provided for reciprocating the auxiliary hopper. In the present embodiment of my invention this means embodies a sprocket pinion 68, rotatably mounted upon the main drive shaft 69, or any other suitable shaft, and adapted to be connected therewith by means of the clutch mechanism 70 which may be of any suitable construction. A chain 71 connects the sprocket pinion 68 with the sprocket gear 72 that is mounted upon and rotates with the countershaft 73. This shaft is supported by suitable bearing blocks 74 carried by a bracket construction 75. A bevel gear 76 is mounted upon the shaft 73 and meshes with a corresponding bevel gear 77 on the shaft 78. The shaft 78 is carried by suitably supported bearing blocks 79. A slotted crank arm 80 is also rigidly secured to and mounted upon the shaft 73 and receives the crank pin 81, which may be adjusted in the slot 82 of the crank arm and held in its adjusted position by any suitable means well known to those skilled in this art.

A link formed of the two rods 83 and 85, connected together with the adjustable take-up union 86, has one end pivotally mounted upon the crank pin 81 and the other end pivotally mounted upon the pivot pin 87 carried by a bracket 88 extending upwardly from the adjacent end of the auxiliary hopper.

From the above description it will be seen that when the machine is in operation, the rotation of the crank arm 80 will cause the auxiliary hopper to reciprocate on the tracks 48 and 49, and that the travel, or throw, of the hopper can be adjusted by moving the crank pin 81 in or out of the slot 82 of the crank arm.

In order to maintain continuous rotation of the feed control roller 64, the shaft 65 upon which it is mounted is extended laterally and passed through the hub 89 of the sprocket gear 90 that is splined, or feathered, upon the outer end of the shaft 65 and confined between the two bearing blocks 91 and 92 supporting the extreme end of the shaft 65. The sprocket gear 90 is driven from the sprocket gear 93 carried by the shaft 78. In this manner the shaft 65 is permitted to reciprocate in the bearing blocks 91 and 92 and through the hub of the gear 90, but at the same time is rotated through the spline connection between the hub of the last mentioned gear and the shaft 65.

Downwardly and outwardly inclined deflectors 94, placed at opposite sides of the strip beneath the auxiliary hopper, provide means for deflecting the grits discharged from the two end compartments of the auxiliary hopper, while these extend outwardly beyond the edge of the strip, to positions where they can easily be recovered and returned to the proper compartment in the main hopper.

Having thus described the means by which the grits may be supplied to the strip in either straight or wavy stripes, I shall now describe the means that I employ for recovering, separately, the different colored grits that are supplied to the strip in excess of that required completely to cover the strip.

I have already mentioned the fact that the two rolls 10 and 11 are adapted to pull the felt strip through the coating machine, and it will be seen from an inspection of Figure 2 that as the strip passes from the roll 11 to the roll 10 the coated surface of the felt is downwardly disposed, so that any excess grits can drop therefrom. These grits pass onto the doctor-blade 95 that is substantially as long as the roll 11, and slide downwardly in stripes of substantially the same width as the stripes on the felt strip. For recovering the excess grits that were originally discharged from the end compartments 35a and 41a of the auxiliary hopper I provide the transversely extending belt conveyor comprising the conveyor belt 96 that passes over the pulleys 97 and 98 (see Figure 6). The stretches of this conveyor belt are supported by the angle irons 99 and 100, all of which may be supported by any suitable frame. This conveyor belt, as shown in Figure 6, extends entirely across the machine and is adapted to catch any grits that are discharged upon it from the doctor-blade 95. In order separately to recover the excess grits that correspond to the different colored stripes, I provide a plurality of trays 36d, 37d, 38d, 39d, and 40d, of which the trays 36d, 38d and 40d are designed to catch the red grits discharged from the doctor-blade and the trays 37d and 39d are designed to catch the green grits discharged from the doctor-blade. These trays are all mounted upon a suitable support, such as the rod 101, and in the embodiment of my invention disclosed herein slide upon the vertical flange of one of the angle irons 99 (see Figure 7). The flange of this angle iron is received between the rod 101 and a second angle iron 102 secured to the bottoms of the trays 36d to 40d, inclusive.

Any suitable means may be employed for causing the rod 101 to reciprocate, such, for instance, as are used for causing reciprocation of the auxiliary hopper. It is, therefore, believed to be unnecessary to repeat this description. It will be noted that the trays 36d to 40d, inclusive, are each substantially as wide as the corresponding stripe produced on the felt strip and it will, therefore, be clear that if the rod 101 is reciprocated in unison with the auxiliary hopper, the trays 36d to 40d, inclusive, will follow the discharge of the different colored grits across the doctor-blade so as always to be positioned to interrupt and recover grits of the same color. The last mentioned statement is not to be construed to mean that the trays 36d to 40d, inclusive, move in one direction at the same time that the hopper moves in that direction, because it may happen, due to the spacing between that portion of the strip lying immediately below the auxiliary hopper and that portion of the strip that is discharging its excess grits onto the doctor-blade, that the auxiliary hopper will be in one extreme of its movement, while the trays are in the other extreme of their movement, but it will, of course, be apparent that each of these instrumentalities performs a complete cycle of operation in substantially the same time as the other. The trays 36d, 38d and 40d are provided with discharge chutes 103 that discharge into a common inclined chute 104 for delivering the recovered red grits into any suitable receptacle, and the trays 37d and 39d are provided with inclined chutes 105 that discharge into the chute 106 for carrying the recovered green grits to a desired receiver.

The preceding description of the means that I have disclosed for separately recovering the different colored grits may, by suitable variation or modification, be employed for recovering any number of different colored grits as may be desired. It will be understood that due to the slight overlapping of the edges of the different colored stripes, there will not be a complete separation of the different colored grits from each other, but the slight amount of red that mixes with the green, or vice versa, will not be sufficient to materially affect the appearance of the roofing where the recovered grits are returned to their respective compartments and used again.

While I have described the details of construction of the preferred embodiment of my invention, it is to be clearly understood that my invention is not limited to these details but is capable of other adaptations and modifications within the scope of the appended claims.

Having thus described my invention, what I claim is:

1. A machine for coating a strip of roofing material with grits comprising a main hopper having first and second transversely extending bins, said second bin being divided into a plurality of compartments, an auxiliary hopper positioned below said second bin and mounted to reciprocate transversely of said machine, said auxiliary hopper having a plurality of compartments corresponding in number to the number of compartments in said second bin, a tube leading from each of the compartments in said second bin to and into the corresponding compartment in said auxiliary hopper, means for passing said strip below said hoppers, means for controlling the discharge of grits from said first bin and said auxiliary hopper onto said strip, a doctor-roll over which the coated strip passes, a doctor-blade, means for separately recovering the excess grits of different color passing over said doctor-blade, and means for reciprocating said auxiliary hopper.

2. A machine for coating a strip of roofing material with grits comprising a main hopper having first and second transversely extending bins, said second bin being divided into a plurality of compartments, an auxiliary hopper positioned below said second bin and mounted to reciprocate transversely of said machine, said auxiliary hopper having a plurality of compartments corresponding in number to the number of compartments in said second bin, a tube leading from each of the compartments in said second bin to and into the corresponding compartment in said auxiliary hopper, means for passing said strip below said hoppers, and means for controlling the discharge of grits from said first bin and said auxiliary hopper onto said strip.

3. A machine for coating a strip of roofing material with grits comprising a main hopper having first and second transversely extending bins, said second bin being divided into a plurality of compartments, an auxiliary hopper mounted below said second bin and comprising a plurality of compartments corresponding in number to the number of compartments in said second bin, means for conducting grits from each of the compartments in said second bin to the corresponding compartment in said auxiliary hopper, means for passing said strip below said hoppers, means for controlling the discharge of grits from said first bin and said auxiliary hopper onto said strip, and means for reciprocating said auxiliary hopper transversely of said strip.

4. A machine for coating a strip of roofing material with grits comprising a main hopper having a transversely extending bin, said bin being divided into a plurality of compartments, an auxiliary hopper mounted below said bin and comprising a plurality of compartments corresponding in number to the number of compartments in said bin, means for conducting grits from each of the compartments in said bin to the corresponding compartment in said auxiliary hopper, means for passing said strip below said hoppers, means for controlling the discharge of grits from said auxiliary hopper onto said strip, and means for reciprocating said auxiliary hopper transversely of said strip.

5. A machine for coating a strip of roofing material with grits comprising means for advancing said strip through said machine, a hopper extending transversely of said strip and mounted to reciprocate across said strip, means for reciprocating said hopper, said hopper having a plurality of compartments, the end ones being longer than the intermediate ones, means for controlling the discharge of grits from said compartments onto said strip, and a second hopper positioned higher than said first named hopper and having a plurality of compartments corresponding in number with the number of compartments in said first named hopper and each discharging into the corresponding compartment of said first named hopper.

6. A machine for coating a strip of roofing material with grits comprising means for advancing said strip through said machine, a hopper extending transversely of said strip and mounted to reciprocate across said strip, means for reciprocating said hopper, said hopper having a plurality of compartments, means for controlling the discharge of grits from said compartments onto said strip, and means for supplying grits to each of said compartments, said means including means for maintaining a predetermined level of grits in each of said compartments.

7. Means for coating a strip of roofing material with grits comprising means for advancing said strip, a hopper positioned higher than said strip and having a plurality of compartments for discharging grits onto said strip, means for moving said hopper transversely of said strip, and means for recovering excess grits discharged onto said strip and keeping separate the excess grits from the different compartments, comprising a roll over which said strip passes, a doctor-blade positioned to receive excess grits thrown off said strip as it passes around said roll, a plurality of trays mounted below the edge of said doctor-blade to receive the grits discharged therefrom, and means for reciprocating said trays in unison with said hopper.

8. Means for covering a strip of roofing material with grits comprising means for advancing said strip, means for discharging streams of a plurality of different colored grits onto said strip, means for moving said streams transversely of said strip, and means for separately recovering the excess grits of different colors.

9. Means for covering a strip of roofing material with grits comprising means for advancing said strip, means for discharging streams of a plurality of different colored grits onto said strip, and means for separately recovering the excess grits of different colors.

10. Means for covering a strip of roofing material with grits in stripes of different colors comprising means for advancing said strip, means for directing streams of a plurality of different colored grits onto said strip, and means for separately recovering the excess grits of different colors comprising a roll over which said strip passes, a plurality of trays for receiving grits from said strip, and means for moving said trays.

11. Means for covering a strip of roofing material with grits in stripes of different colors comprising means for advancing said strip, means for directing streams of a plurality of different colored grits onto said strip, and means for separately recovering the excess grits of different colors comprising a roll over which said strip passes, and a plurality of trays for receiving grits from said strip.

12. Means for covering a strip of roofing material with grits in stripes of different colors comprising a main hopper for applying a coating of grits over the entire width of said advancing strip, an auxiliary hopper for applying a plurality of stripes of grits to said advancing strip, and means for dropping the grits from both hoppers on the strip at the same point.

13. Means for covering a strip of roofing with grits comprising two separate grit holding means and grit feeding rollers each extending transversely of the strip, and means for blending the grits delivered from said feed rollers before they reach the strip, said means comprising a third roller, and means including an inclined guide for causing the grits from both said rollers to drop on said third roller and then fall onto said strip.

14. Means for covering a strip of roofing with grits comprising two separate grit holding means and grit feeding rollers each extending transversely of the strip, and means for blending the grits delivered from said feed rollers before they reach the strip.

15. Means for covering a strip of roofing material with grits in stripes of different colors, comprising a main hopper for applying a coating of grits over the entire width of said advancing strips, an auxiliary hopper for applying a plurality of stripes of grits to said advancing strip and means for dropping the grits in intermingled or blended condition from both hoppers on the strip at the same point and at the same time.

In witness whereof, I hereunto subscribe my name this 25th day of February, 1926.

ROBERT MACLEAN.